US011042343B2

(12) United States Patent
Sakuma

(10) Patent No.: US 11,042,343 B2
(45) Date of Patent: Jun. 22, 2021

(54) DATA TRANSFER SYSTEM, DISPLAY DEVICE, PORTABLE INFORMATION TERMINAL, AND DATA TRANSFER METHOD

(71) Applicant: NEC DIsplay Solutions, Ltd., Tokyo (JP)

(72) Inventor: Hiroyuki Sakuma, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/823,778

(22) Filed: Mar. 19, 2020

(65) Prior Publication Data
US 2020/0218496 A1 Jul. 9, 2020

Related U.S. Application Data

(63) Continuation of application No. 15/305,017, filed as application No. PCT/JP2014/062830 on May 14, 2014, now Pat. No. 10,635,375.

(51) Int. Cl.
G06F 3/0481 (2013.01)
G06F 3/0488 (2013.01)
(Continued)

(52) U.S. Cl.
CPC .......... G06F 3/1454 (2013.01); G06F 3/0481 (2013.01); G06F 3/0488 (2013.01);
(Continued)

(58) Field of Classification Search
CPC .... G06F 3/1454; G06F 3/0486; G06F 3/0488; G09G 5/14; G09G 2370/22; G09G 2354/00; H04L 67/10
See application file for complete search history.

(56) References Cited

U.S. PATENT DOCUMENTS 8,756,532 B2 * 6/2014 Poon .................. H04W 4/21
715/863
2002/0122075 A1 * 9/2002 Karasawa ............... G06T 1/00
715/846
(Continued)

FOREIGN PATENT DOCUMENTS

CN    1234695 A    11/1999
JP    2004-234291 A    8/2004
(Continued)

OTHER PUBLICATIONS

United States Notice of Allowance dated Dec. 31, 2019, in U.S. Appl. No. 15/305,017.
(Continued)

Primary Examiner — Ryan A Lubit
(74) Attorney, Agent, or Firm — McGinn I.P. Law Group, PLLC

(57) ABSTRACT

A portable information terminal includes an imaging unit that captures a storage location image displayed on a display device to acquire information indicating a storage location in a storage device, a display panel including a display screen that displays a data image and a display device image indicating the display device, and a manipulation detection unit that detects, on the display screen, a manipulation of moving the data image toward the display device image. The portable information terminal stores data in the storage location when the manipulation detection unit detects the manipulation.

18 Claims, 11 Drawing Sheets

(51) Int. Cl.
  *G06F 3/14* (2006.01)
  *G09G 5/14* (2006.01)
  *H04M 1/00* (2006.01)
  *H04M 1/72409* (2021.01)
  *H04M 11/00* (2006.01)
  *H04L 29/08* (2006.01)
  *G06F 3/0486* (2013.01)

(52) U.S. Cl.
  CPC ............... *G09G 5/14* (2013.01); *H04L 67/10* (2013.01); *H04M 1/00* (2013.01); *H04M 1/72409* (2021.01); *H04M 11/00* (2013.01); *G06F 3/0486* (2013.01); *G09G 2354/00* (2013.01); *G09G 2370/22* (2013.01)

(56) References Cited

U.S. PATENT DOCUMENTS

| | | | |
|---|---|---|---|
| 2009/0300719 A1 | 12/2009 | Ferris | |
| 2010/0297939 A1 | 11/2010 | Fujita | |
| 2011/0090477 A1 | 4/2011 | Haga et al. | |
| 2011/0294433 A1* | 12/2011 | Matsubara | G06F 3/0484 455/41.3 |
| 2012/0072853 A1 | 3/2012 | Krigström et al. | |
| 2012/0206391 A1* | 8/2012 | Kim | G06F 3/04886 345/173 |
| 2012/0211559 A1 | 8/2012 | Okuyama et al. | |
| 2013/0235496 A1 | 9/2013 | Lai et al. | |
| 2014/0084067 A1* | 3/2014 | Vanderhulst | H04B 10/116 235/462.01 |
| 2014/0320542 A1* | 10/2014 | Naruse | G06F 3/1454 345/690 |
| 2015/0054852 A1* | 2/2015 | Ohnuma | G09G 5/14 345/635 |
| 2015/0229697 A1* | 8/2015 | Grobelny | G06F 3/04817 715/748 |
| 2015/0249709 A1 | 9/2015 | Teng et al. | |

FOREIGN PATENT DOCUMENTS

| | | |
|---|---|---|
| JP | 2011-090477 A | 5/2011 |
| JP | 2011-257990 A | 12/2011 |
| JP | 2013-235496 A | 11/2013 |

OTHER PUBLICATIONS

United States Office Action dated Aug. 22, 2019, in U.S. Appl. No. 15/305,017.
United States Office Action dated Mar. 21, 2019, in U.S. Appl. No. 15/305,017.
United States Office Action dated Sep. 28, 2018, in U.S. Appl. No. 15/305,017.
United States Office Action dated Apr. 20, 2018, in U.S. Appl. No. 15/305,017.
International Search Report (ISR) (PCT Form PCT/ISA/210), in PCT/JP2014/062830, dated Aug. 5, 2014.
Chinese Notice of Allowance dated May 13, 2019, in Chinese Patent Application No. 201480078763.6 with an English translation.
Extended European Search Report dated Sep. 29, 2017 in European Application No. 14892207.3.
United States Office Action dated Nov. 13, 2020 in U.S. Appl. No. 16/823,787.

* cited by examiner

DATA TRANSFER SYSTEM, DISPLAY DEVICE, PORTABLE INFORMATION TERMINAL, AND DATA TRANSFER METHOD

The present application is a Continuation Application of U.S. patent application Ser. No. 15/305,017, filed on Oct. 18, 2016, which is based on International Patent Application No. PCT/JP2014/062830, filed on May 14, 2014, the entire contents of which are incorporated herein by reference.

TECHNICAL FIELD

The present invention relates to a data transfer system, a display device, a portable information terminal, a data transfer method, and a program for transferring data between a portable information terminal and a display device including a display panel.

BACKGROUND ART

A data transfer system transfers data between a display device and a portable information terminal (see Patent Literature 1). The data transfer system described in Patent Literature 1 directly connects the display device and the portable information terminal, and data is transmitted and received between the display device and the portable information terminal.

DOCUMENTS OF THE PRIOR ART

Patent Literature

[Patent Literature 1] Japanese Unexamined Patent Application, First Publication No. 2011-90477

DISCLOSURE OF INVENTION

Problem to be Solved by the Invention

As disclosed in the above-mentioned Patent Literature 1, in order to transfer data between the display device and the portable information terminal, it is only necessary to directly connect the display device and the portable information terminal and perform transmission/reception of data. However, a cable connection, a wireless pairing manipulation, or the like is necessary to directly connect the display device and the portable information terminal and settings are complicated.

An objective of the present invention is to provide a data transfer system, a display device, a portable information terminal, a data transfer method, and a program capable of transferring data between a display device and a portable information terminal without a cable connection, a wireless pairing manipulation, or the like between the portable information terminal and the display device being performed.

Means for Solving the Problem

A data transfer system of a first aspect of the present invention includes a display device and a portable information terminal, the display device including: a first display panel having a first display screen for displaying an image; a terminal detection unit configured to detect that the portable information terminal has approached the first display screen; and a first display processing unit configured to cause the first display screen to display a storage location image which is an image indicating information about a storage location of data in another when the approach of the portable information terminal is detected by the terminal detection unit.

Also, a display device of a second aspect of the present invention is the display device included in a data transfer system including a portable information terminal and the display device, the display device including a first display panel having a first display screen for displaying an image, a terminal detection unit configured to detect that the portable information terminal has approached the first display screen, and a first display processing unit configured to cause the first display screen to display a storage location image which is an image indicating information about a storage location of data in another device when the terminal detection unit detects that the portable information terminal has approached the first display screen.

Also, a portable information terminal of a third aspect of the present invention is the portable information terminal included in a data transfer system including a display device and the portable information terminal, the portable information terminal including an imaging unit, and an information acquisition unit configured to acquire information about a storage location of data in another device on the basis of a storage location image captured by the imaging unit, wherein the storage location image is an image indicating information about the storage location of the data and is displayed on a display screen of the display device when the portable information terminal has approached the display screen.

Also, a data transfer method of a fourth aspect of the present invention is a data transfer method used in a data transfer system including a display device and a portable information terminal, wherein the display device includes a first display panel having a first display screen for displaying an image and a terminal detection unit configured to detect that the portable information terminal has approached the first display screen, the data transfer method including the step of: causing the first display screen to display a storage location image which is an image indicating information about a storage location of data in another device when the approach of the portable information terminal is detected by the terminal detection unit.

Effect of the Invention

According to the present invention, there is an advantage in that it is possible to transfer data between a display device and a portable information terminal without a cable connection, a wireless pairing manipulation, or the like between the portable information terminal and the display device being performed.

EMBODIMENTS FOR CARRYING OUT THE INVENTION

Hereinafter, preferred embodiments of the present invention will be described with reference to the drawings. However, the present invention is not limited to the following embodiments. For example, components of the embodiments may be appropriately combined.

Figure 1:
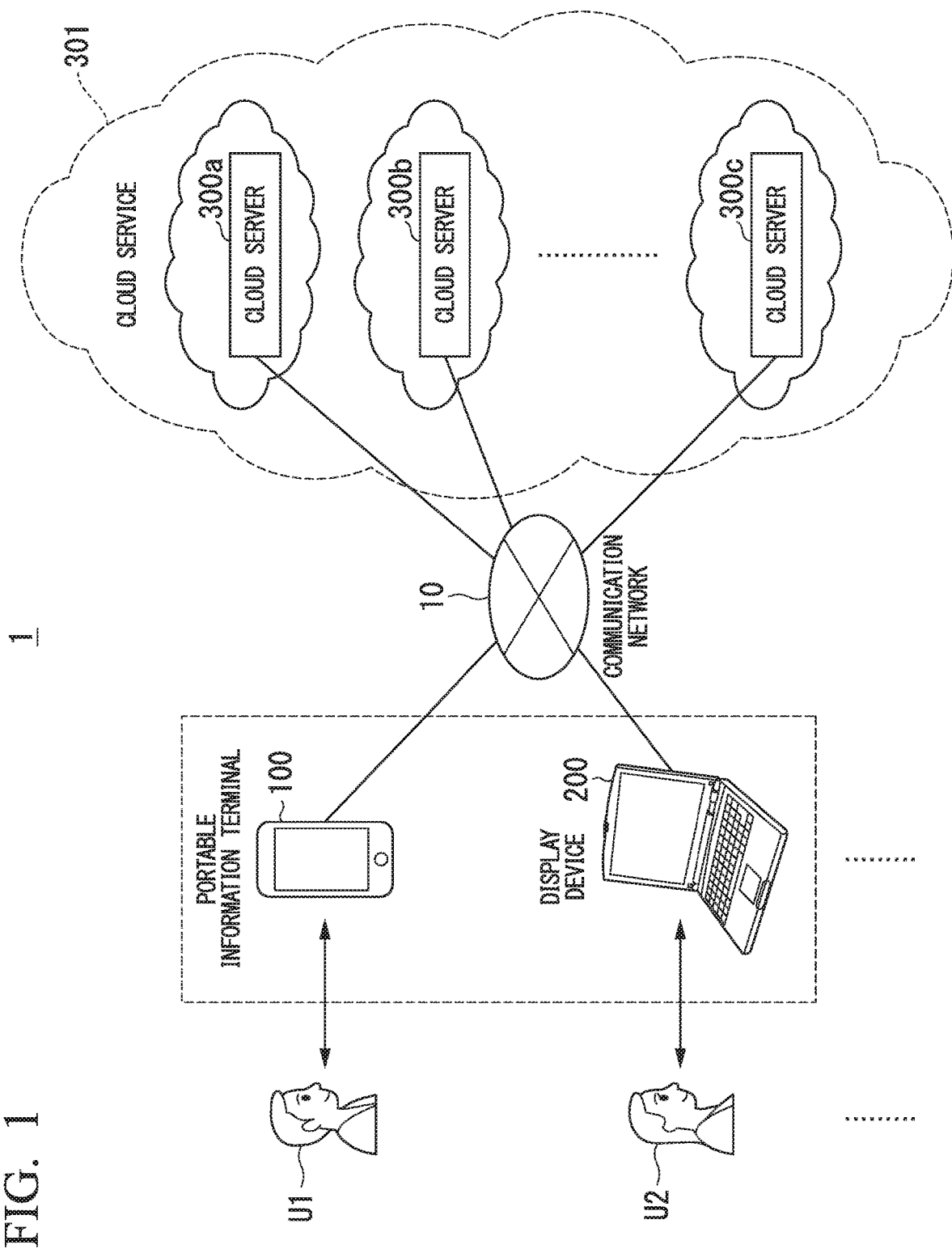
FIG. 1 is an explanatory diagram illustrating a schematic configuration of a data transfer system of the present invention.

FIG. 1 is an explanatory diagram illustrating a schematic configuration of a data transfer system of the present invention.

In a data transfer system 1 of the present invention, a portable information terminal 100 manipulated by a user U1 and a display device 200 manipulated by a user U2 transfer data using a cloud service 301. The portable information terminal 100 includes an imaging unit such as a CCD camera, and the display device 200 includes a display screen having a touch panel such as an optical touch panel. This display device 200 may be a tablet terminal or a desktop personal computer as well as a notebook personal computer.

In this data transfer system 1, the portable information terminal 100 is arranged on a touch panel type display screen 202 of the display device 200 or the portable information terminal 100 is arranged in proximity to the display screen 202 of the display device 200, so that the portable information terminal 100 and the display device 200 automatically cooperate with each other. The portable information terminal 100 and the display device 200 in cooperation with each other perform the transmission/reception of data via the cloud service 301.

Also, the number of sets of portable information terminals 100 and display devices 200 in cooperation with each other may be two or more.

Also, data transmitted via the cloud service 301 also includes data of a non-file format (for example, streaming type moving-image data) as well as data of a file format.

Services provided by cloud computing are collectively referred to as the above-mentioned cloud service 301, and a plurality of cloud servers 300a, 300b, . . . , 300c cooperate with one another and are formed as a single computer resource referred to as a cloud.

Also, an example in which the plurality of cloud servers 300a, 300b, . . . , 300c are in cooperation with one another to provide the cloud service 301 is illustrated in FIG. 1, but the provision of the cloud service 301 may be performed by one cloud server. Also, in the following description, the plurality of cloud servers 300a, 300b, . . . , 300c are referred to as a "cloud server 300."

In the above-mentioned data transfer system 1, uniform resource locator (URL) information including a storage location of data in the cloud server 300 (another device) or the like is displayed as image information (a storage location image) on the display screen 202 (a first display screen) when the display device 200 detects the approach of the portable information terminal 100. For example, the display device 200 transmits the URL information or the like to the portable information terminal 100 by displaying an image displayed on the display screen while changing a luminance value according to the passage of time (hereinafter also referred to as "blinking display"). For example, the display device 200 can transmit the URL information or the like to the portable information terminal 100 by pre-coding a combination of lengths of time for which the light is on and off when blinking display of the image is performed.

The portable information terminal 100 captures image information displayed on the display screen 202 and acquires the URL information or the like indicating the storage location of the data in the cloud server 300 from the captured image information. The portable information terminal 100 acquires data stored in the cloud server 300 on the basis of the URL information indicating the storage location of the data. Alternatively, the portable information terminal 100 transmits the data to the cloud server 300 on the basis of the URL information indicating the storage location of the data and causes the cloud server 300 to store the transmitted data.

Thus, the display device 200 can transmit information to the portable information terminal 100 by displaying the image information on the display screen 202. Thus, the data transfer system 1 can transfer the data between the portable information terminal 100 and the display device 200 via the cloud server 300 without a cable connection, a wireless pairing manipulation, or the like being performed.

Figure 2A:
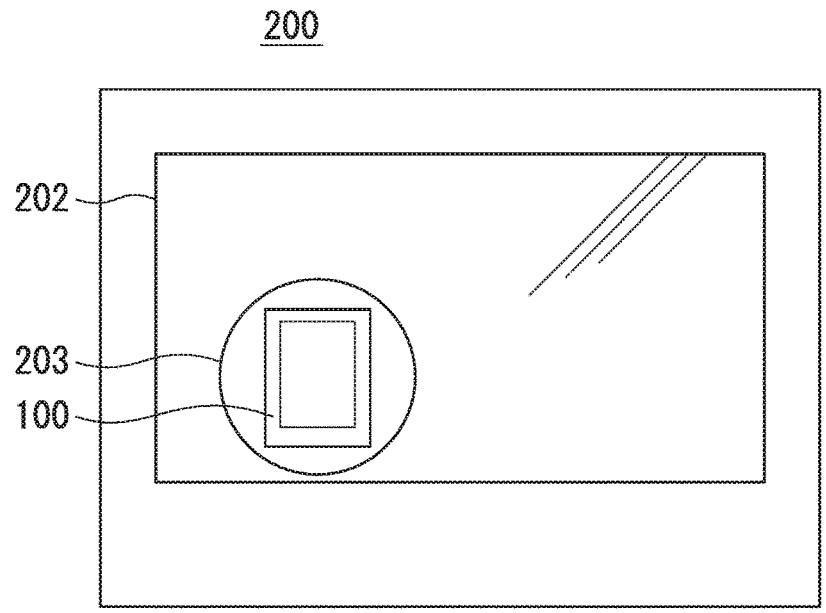
FIG. 2A is an explanatory diagram illustrating a first arrangement example of a portable information terminal 100 in the data transfer system 1.

FIG. 2A is an explanatory diagram illustrating a first arrangement example of a portable information terminal 100 in the data transfer system 1, and illustrates an example in which the portable information terminal 100 is directly arranged on the touch panel type display screen 202 in the display device 200.

As illustrated in FIG. 2A, for example, by arranging the portable information terminal 100 on the touch panel type display screen 202, the display device 200 detects that the portable information terminal 100 is arranged on the display screen 202. The display device 200 displays a window 203 in a circular area surrounding the portable information terminal 100 arranged on the display screen 202. Also, when the portable information terminal 100 is removed from the display screen 202, the display device 200 removes the display of the circular window 203. Also, the circular window 203 is not limited to a circular shape, and may be an oval shape or a polygonal shape. Also, the circular window 203 may be simply referred to as the "window 203."

Thus, the display device 200 detects an operation of placing the portable information terminal 100 on the touch panel type display screen 202 and an operation of removing the portable information terminal 100 from the touch panel type display screen 202 and can link these operations with activation and termination manipulations of a data transmission application. Thus, the activation and termination manipulations of the data transmission application can be simplified.

Also, when the portable information terminal 100 is arranged on the touch panel type display screen 202, the detection of the shape and the location of the portable information terminal 100 is possible regardless of the shape (size) or location of the portable information terminal 100 arranged on the display screen 202.

Also, when information is transmitted to the portable information terminal 100 by causing blinking display of the window 203 to be performed, the display device 200 can use a short URL displayed by shortening the display of the URL as URL information indicating the storage location of the data in the cloud service 301 to reduce an amount of information to be transmitted.

Thus, because the display device 200 transmits information to the portable information terminal 100 by the blinking display of the window 203, communication is possible even when the focus of a CCD camera of the imaging unit is not adjusted in a state in which the portable information terminal 100 is placed on the display screen 202.

Also, for example, by generating the window 203 displayed at a terminal position on the display screen 202 in a circular shape, a communication error due to detection deviation of the terminal position is prevented and unnecessary areal occupation on the display screen 202 is prevented, so that the inhibition of a file movement manipulation can be avoided.

Figure 2B:
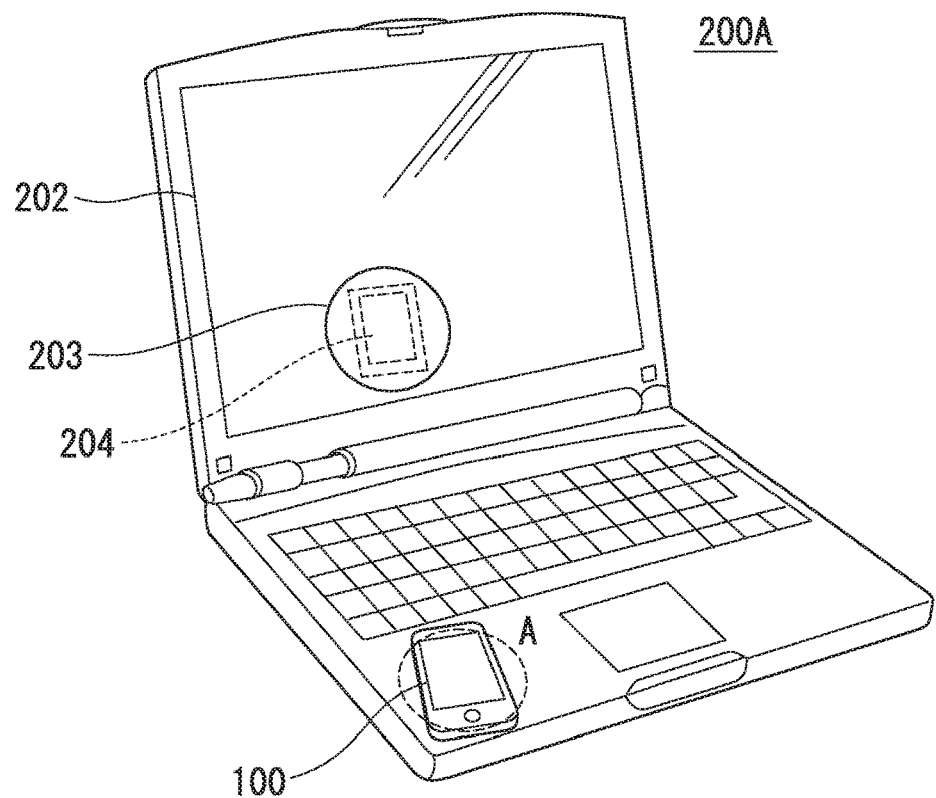
FIG. 2B is an explanatory diagram illustrating a second arrangement example of the portable information terminal 100 in the data transfer system 1.

FIG. 2B is an explanatory diagram illustrating a second arrangement example of the portable information terminal 100 in the data transfer system 1. FIG. 2B illustrates an example in which the portable information terminal 100 is arranged at a predetermined position A on the surface of a manipulation unit side on which a keyboard or the like is arranged in a display device 200A.

As illustrated in FIG. 2B, when the portable information terminal 100 is arranged at the predetermined position A of the manipulation unit side, the user arranges the portable information terminal 100 so that the imaging unit (not illustrated) faces the direction of the display screen 202. The display device 200A detects that the portable information terminal 100 is arranged at the predetermined position A with a sensor (for example, a pressure sensor or the like). Thereby, the display device 200A detects that the portable information terminal 100 is arranged in proximity to the display screen 202, and an image 204 indicating that the portable information terminal 100 is detected and the window 203 in the circular area surrounding the image 204 are displayed in a predetermined area on the display screen 202. Also, when the portable information terminal 100 is removed from the predetermined position A, the display device 200A deletes the image 204 and the circular window 203 displayed on the display screen 202.

The display device 200A detects an operation of placing the portable information terminal 100 in proximity to the touch panel type display screen 202 and an operation of removing the portable information terminal 100 from the touch panel type display screen 202, and can link these operations with activation and termination manipulations of a data transmission application. Thus, the activation and termination manipulations of the data transmission application can be simplified. Also, the display screen 202 is formed as the touch panel type display screen in the display device 200A as well.

Also, the display device 200 illustrated in FIG. 2A and the display device 200A illustrated in FIG. 2B are different in terms of only a method of arranging the portable information terminal 100 and a method of detecting the portable information terminal 100 and are the same in terms of other basic operations. Thus, the display device 200 and the display device 200A are collectively referred to as the display device 200. When it is necessary to specifically distinguish the display device 200A, it is referred to as the display device 200A.

Figure 3A:
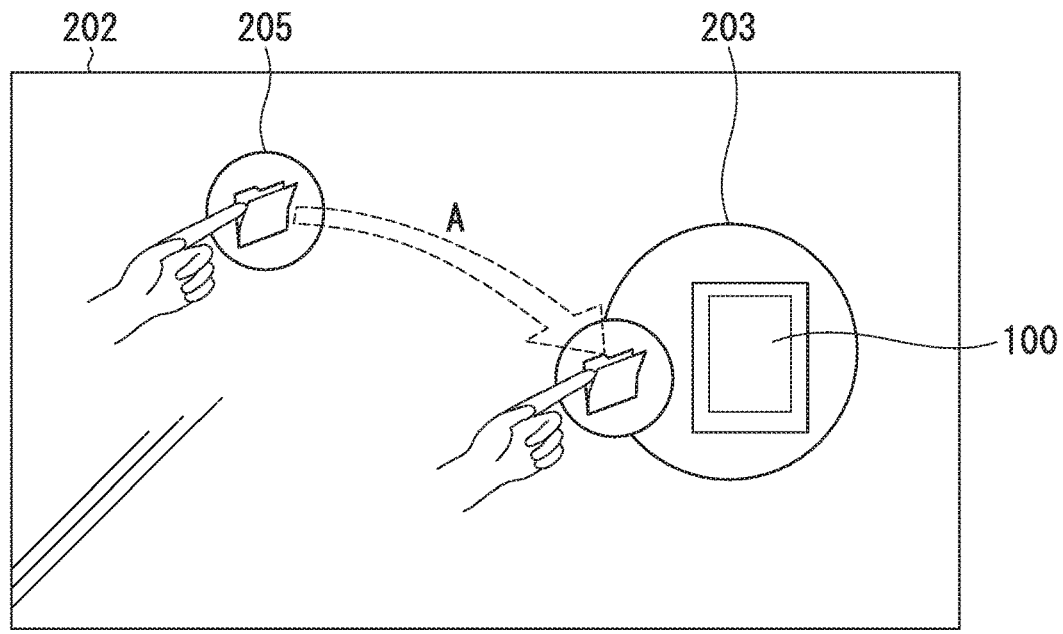
FIG. 3A is an explanatory diagram illustrating a drag-and-drop manipulation of data in a display device 200.

FIG. 3A is an explanatory diagram illustrating a drag-and-drop manipulation of data in the display device 200.

As illustrated in FIG. 3A, for example, an image 205 indicating data serving as a target to be transmitted to the portable information terminal 100 is displayed on the display screen 202 which is a desktop screen or a manipulation screen for performing a file manipulation of an explorer or the like in the display device 200. The user drags the image 205 in a direction indicated by an arrow A according to a manipulation using a mouse or the like or a touch manipulation and drops the image 205 on the circular window 203 or drops the image 205 on an area in the vicinity thereof, and the transmission of data from the display device 200 to the portable information terminal 100 via the cloud server 300 starts.

Thus, because the transmission of data starts according to the drag-and-drop manipulation on the display screen 202 in the display device 200, a simple and intuitive manipulation is possible for the user.

Figure 3B:
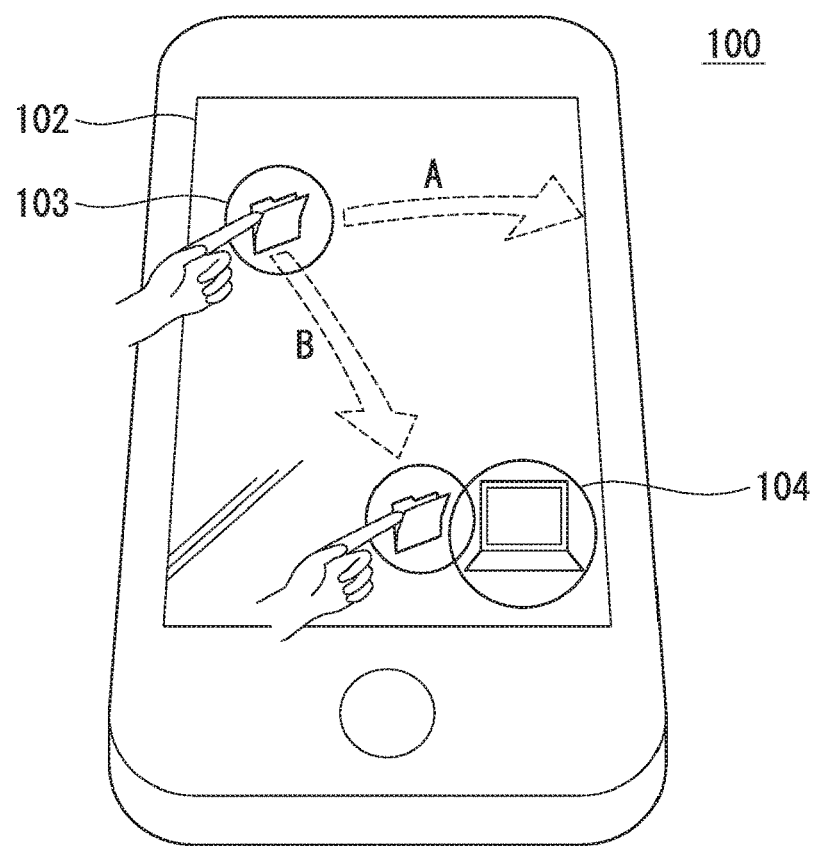
FIG. 3B is an explanatory diagram illustrating a drag-and-drop manipulation of data in the portable information terminal 100.

FIG. 3B is an explanatory diagram illustrating a drag-and-drop manipulation of data in the portable information terminal 100. As illustrated in FIG. 3B, the portable information terminal 100 displays an image 103 indicating data serving as a target to be transmitted to the display device 200 as its own stored data on the display screen 102. The user drags the image 103 in an out-of-frame direction indicated by the arrow A according to the touch manipulation and therefore the transmission of data from the portable information terminal 100 to the display device 200 via the cloud server 300 starts.

Alternatively, an image 104 indicating the display device 200 is displayed on the display screen 102. The user drags the image 103 in a direction indicated by an arrow B according to the touch manipulation and drops the image 103 on an image 104 indicating the display device 200 or in an area in the vicinity thereof, and the transmission of data from the portable information terminal 100 to the display device 200 via the cloud service 301 starts.

Thus, because the transmission of data is started by the drag-and-drop manipulation on the display screen 102 in the portable information terminal 100, a simple and intuitive manipulation is possible for the user.

Figure 4:
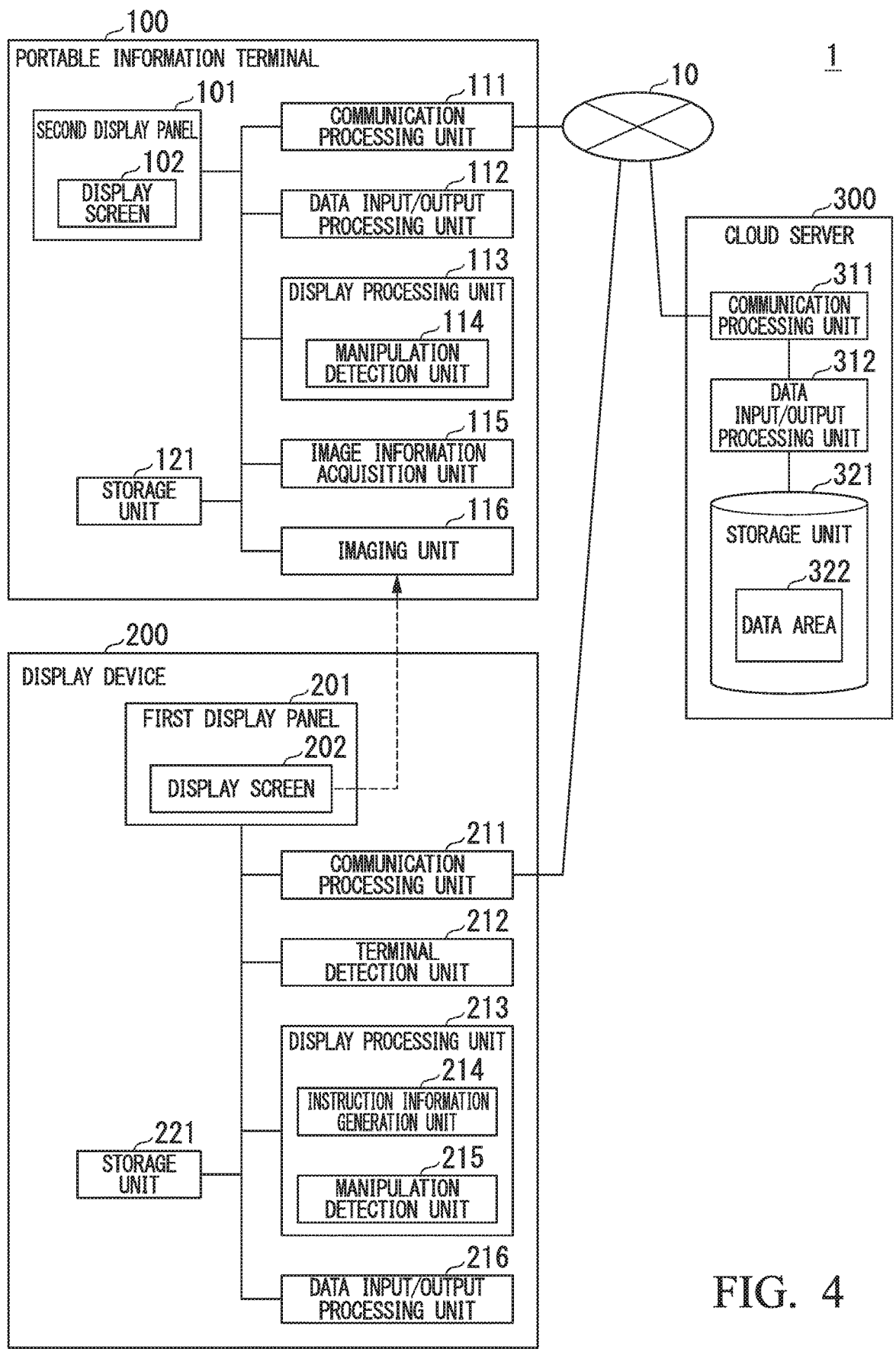
FIG. 4 is a configuration diagram illustrating a configuration example of the portable information terminal 100, the display device 200, and a cloud server 300 in the data transfer system 1.

FIG. 4 is a configuration diagram illustrating a configuration example of the portable information terminal 100, the display device 200, and the cloud server 300 in the data transfer system 1. In FIG. 4, only parts directly related to the present invention are illustrated for the portable information terminal 100, the display device 200, and the cloud server 300.

[Configuration of Portable Information Terminal 100]

In the data transfer system 1 illustrated in FIG. 4, the portable information terminal 100 includes a second display panel 101, a display screen 102, a communication processing unit 111, a data input/output processing unit 112, a display processing unit 113, a manipulation detection unit 114, an image information acquisition unit 115, an imaging unit 116, and a storage unit 121.

The second display panel 101 includes the display screen 102 (a second display screen) and the display screen 102 is a touch panel type display screen constituted of a liquid crystal display panel and a touch panel arranged on a display surface of the liquid crystal display panel. The touch panel is, for example, an optical touch panel. The user performs a touch manipulation on the touch panel, and the display screen 102 detects a position at which the touch manipulation is performed.

The communication processing unit 111 transmits and receives data to and from the cloud server 300 via the communication network 10.

The imaging unit 116 includes a CCD camera, etc. and captures a window 203 displayed on the display screen 202 of the display device 200 as image information.

The image information acquisition unit 115 (an information acquisition unit) acquires URL information indicating a storage location of data stored in the cloud server 300 on the basis of the image information captured by the imaging unit 116. Also, instruction information about a data storage instruction issued from the display device 200 or the like is acquired.

The data input/output processing unit 112 (a second input/output processing unit) acquires data from the cloud server 300 on the basis of URL information indicating the storage location of the data stored in the cloud server 300. Also, the data input/output processing unit 112 transmits its own stored data to the cloud server 300 and causes the cloud server 300 to store the transmitted data.

As illustrated in FIG. 3B, the display processing unit 113 (a second display processing unit) causes the image 103 indicating data serving as a target to be transmitted to the display device 200 as its own stored data to be displayed at a predetermined position on the display screen 102 and causes a predetermined image 104 indicating the display device 200 to be displayed at a predetermined position on the display screen 102.

The manipulation detection unit 114 (a second manipulation detection unit) detects a manipulation of moving the image 103 indicating data displayed on the display screen 102 by a touch manipulation. For example, as illustrated in FIG. 3B, the manipulation detection unit 114 detects that the image 103 is dragged in the out-of-frame direction by the touch manipulation. The manipulation detection unit 114 detects that an operation is performed in a manner that the image 103 is dragged by the touch manipulation and dropped on the image 104 indicating the display device 200 or on an area in the vicinity thereof.

[Configuration of Display Device 200]

The display device 200 includes a first display panel 201, a communication processing unit 211, a terminal detection unit 212, a display processing unit 213 (a first display processing unit), an instruction information generation unit 214, a manipulation detection unit 215, a data input/output processing unit 216 (a first input/output processing unit), and a storage unit 221.

The first display panel 201 includes the display screen 202 (a first display screen), and the display screen 202 is a touch panel type display screen constituted of a liquid crystal display panel and a touch panel arranged on a display surface of the liquid crystal display panel. The touch panel is, for example, an optical touch panel. When the user performs a touch manipulation on the touch panel, the display screen 102 detects a position at which the touch manipulation is performed.

The communication processing unit 211 transmits and receives data to and from the cloud server 300 via the communication network 10.

The terminal detection unit 212 detects that the portable information terminal 100 is arranged in proximity to the display screen 202. For example, the terminal detection unit 212 detects that the portable information terminal 100 is arranged on the touch panel type display screen 202. Alternatively, in the case of the display device 200A (see FIG. 2B), the terminal detection unit 212 detects that the portable information terminal 100 is arranged at a predetermined position in proximity to the display screen 202.

The display processing unit 213 (the first display processing unit) displays image information to be transmitted toward the portable information terminal 100 on the display screen 202 (the first display screen). The display processing unit 213 displays the window 203 indicating that the portable information terminal 100 is detected in an area on the display screen 102 according to a position of the portable information terminal 100 when the terminal detection unit 212 detects that the portable information terminal 100 is arranged in proximity to the display screen 202. Alternatively, in the case of the display device 200A, as illustrated in FIG. 2B, the display processing unit 213 displays the window 203 indicating that the portable information terminal 100 is detected in a predetermined area on the display screen 102 according to a position A of the portable information terminal 100.

Also, in the display processing unit 213, the instruction information generation unit 214 generates "storage instruction information" including URL information about a storage location of data stored in the cloud server 300, and the display processing unit 213 changes a luminance value of an image displayed in the window 203 (image information) to indicate the "storage instruction information" in response to the passage of time, and transmits the generated "storage instruction information" toward the portable information terminal 100. That is, the display processing unit 213 transmits information toward the portable information terminal 100 by causing blinking display of the window 203 to be performed.

Also, as illustrated in FIG. 3A, the display processing unit 213 (the first display processing unit) causes an image 205 (a first data image) indicating data (first data) serving as a target to be transmitted to the portable information terminal 100 to be displayed at a predetermined position on the display screen 202 (the first display screen). The manipulation detection unit 215 (a first manipulation detection unit) detects that a manipulation (a first manipulation) in which the image 205 is subjected to the drag-and-drop manipulation and moved toward an area (a first area) in which the window 203 is displayed is performed on the display screen 202.

The movement of the image indicating the data may be performed by the drag-and-drop manipulation by the manipulation input device such as the mouse or the drag-and-drop manipulation may be performed by the touch manipulation of the touch panel on the display screen 202.

When the manipulation detection unit 215 detects a manipulation (the first manipulation) of moving the image 205 indicating the data to the area (the first area) of the window 203, the instruction information generation unit 214 generates "storage instruction information" including URL information about a storage location of data stored in the cloud server 300 and information for issuing an instruction for storing the data. The display processing unit 213 (an instruction image display unit) transmits the "storage instruction information" (an instruction image) generated by the instruction information generation unit 214 to the portable information terminal 100 by causing blinking display of the window 203 to be performed.

When the display device 200 transmits its own stored data to the portable information terminal 100, the data input/output processing unit 216 (the first input/output processing unit) transmits its own stored data to the cloud server 300 and causes the transmitted data to be stored in the cloud server 300 (a storage location). In this case, the display processing unit 213 transmits "storage instruction information" including URL information about the storage location of the data transmitted to the cloud server 300 and stored in the cloud server 300 to the portable information terminal 100 by causing blinking display of the window 203 on the display screen 202 to be performed. Also, the data input/output processing unit 216 receives data transmitted from the portable information terminal 100 to the cloud server 300 via the cloud server 300.

[Configuration of Cloud Server 300]

The cloud server 300 includes a communication processing unit 311, a data input/output processing unit 312, and a storage unit 321.

The communication processing unit 311 performs the transmission/reception of data between the portable information terminal 100 and the display device 200 via the communication network 10.

The data input/output processing unit 312 receives data from the display device 200, stores the received data in the data area 322, and notifies the display device 200 of the URL information indicating the storage location of the stored data. Also, the data input/output processing unit 312 receives data from the portable information terminal 100, stores the received data in the data area 322, and notifies the display device 200 of the URL information indicating the storage location of the stored data.

Also, the data input/output processing unit 312 receives a data transmission request from the portable information terminal 100 and the display device 200 and transmits the data stored in the data area 322 or its own stored data to the portable information terminal 100 or the display device 200 transmitting the data transmission request.

[Flow of Process in Data Transfer System 1]

Figure 5:
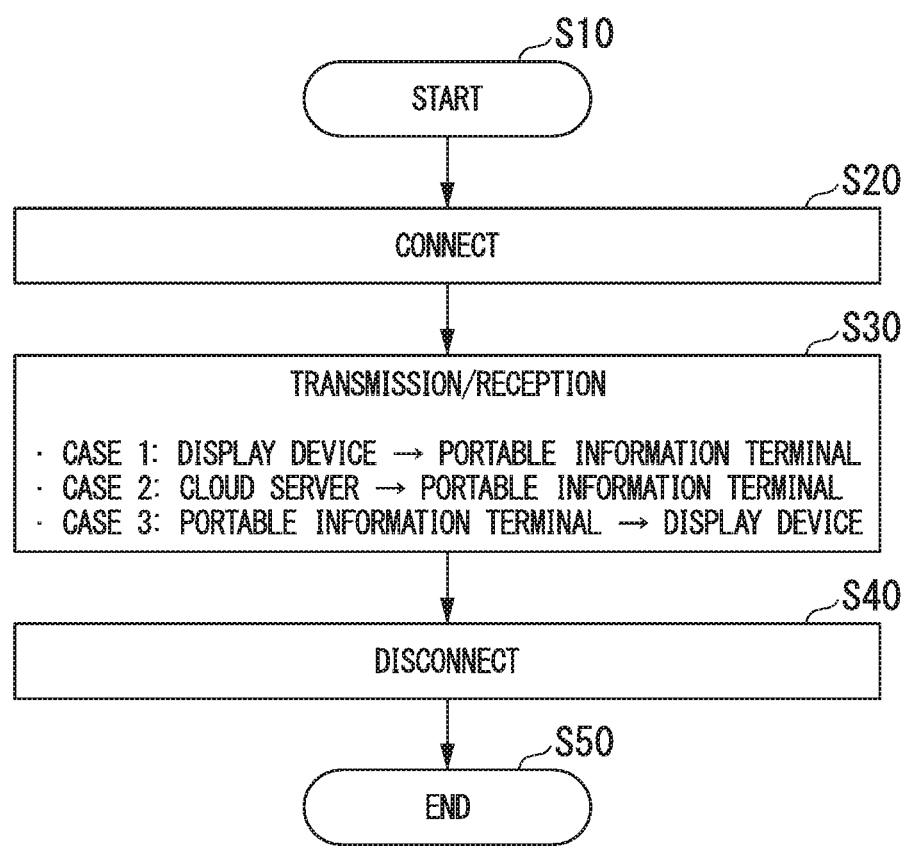
FIG. 5 is a flowchart illustrating an overview of a data transmission/reception process performed in the data transfer system 1.

FIG. 5 is a flowchart illustrating an overview of a data transmission/reception process performed in the data transfer system 1. Hereinafter, the flow of the process will be described with reference to FIG. 5.

First, when the portable information terminal 100 is arranged at a position close to the display screen 202 of the display device 200 and the process starts (step S10), the portable information terminal 100 and the display device 200 perform a connection process for cooperation with each other (step S20). Details of the connection process will be described below.

When the connection process between the display device 200 and the portable information terminal 100 is completed, a process of transmitting and receiving data between the display device 200 and the portable information terminal 100 is performed via the cloud server 300 (step S30). In the data transmission/reception process in step S30, data may be transmitted from the display device 200 to the portable information terminal 100 via the cloud server 300 as a first case (case 1). Also, as a second case (case 2), data may be transmitted from the cloud server 300 to the portable information terminal 100. Also, as a third case (case 3), data may be transmitted from the portable information terminal 100 to the display device 200 via the cloud server 300. The portable information terminal 100, the display device 200, and the cloud server 300 execute a process corresponding to each case mentioned above. Details of the process to be performed in each of the first case, the second case, and the third case will be described below.

Also, the data to be transmitted via the cloud server 300 also includes data of a non-file format (for example, streaming type moving-image data) as well as data of a file format.

When the data transmission/reception process in step S30 ends, the portable information terminal 100 and the display device 200 perform a disconnection process for ending cooperation (step S40). Details of the disconnection process will be described below.

After the disconnection process of step S40 is performed, the portable information terminal 100 and the display device 200 end the data transmission/reception process (step S50).

Figure 6:
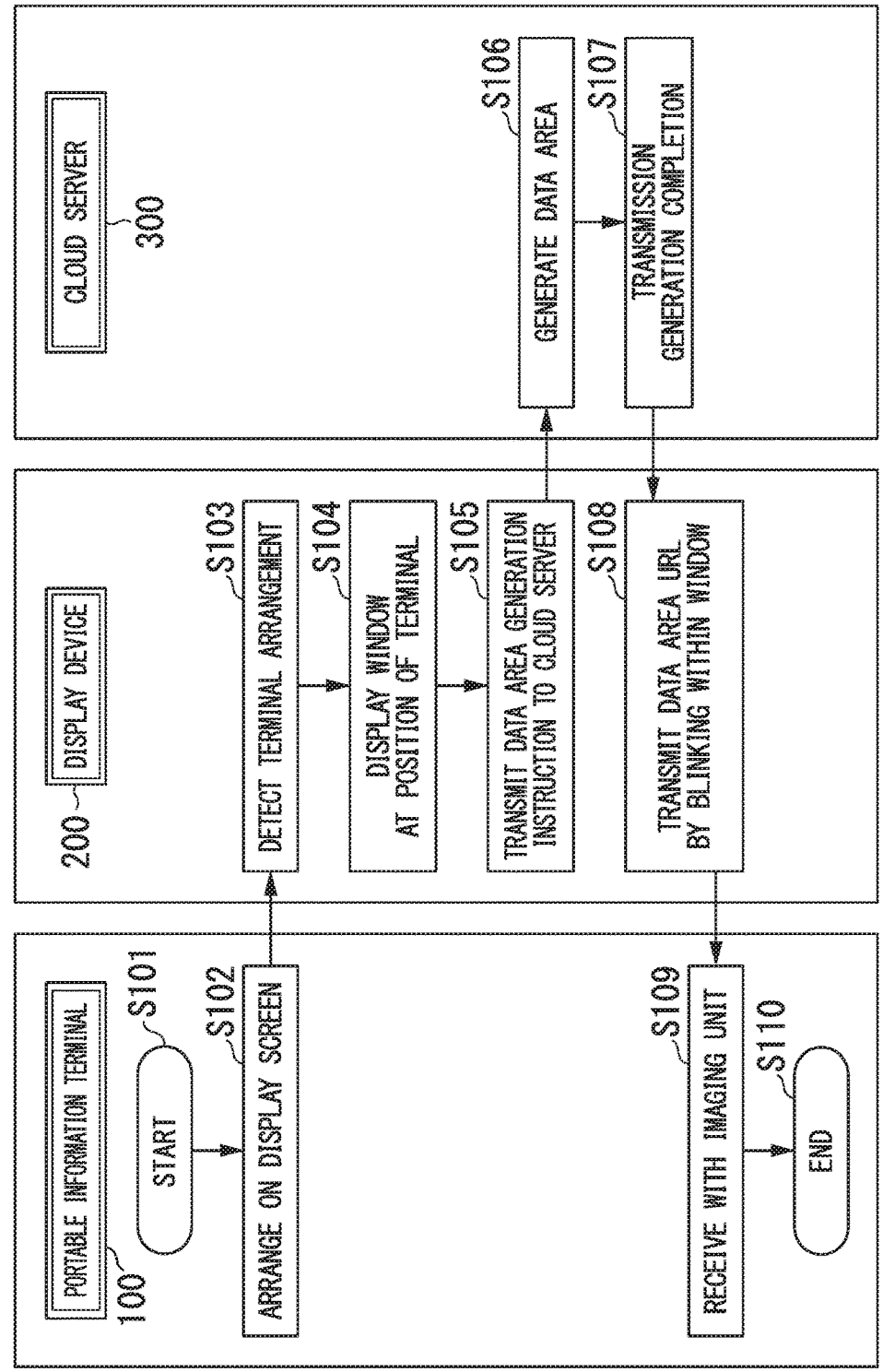
FIG. 6 is a sequence diagram illustrating a flow of a connection process between the portable information terminal 100 and the display device 200.

FIG. 6 is a sequence diagram illustrating a flow of a connection process between the portable information terminal 100 and the display device 200. The sequence diagram illustrated in FIG. 6 illustrates a detailed flow of the connection process of step S20 of the flowchart illustrated in FIG. 5. Also, the connection process illustrated in FIG. 6 illustrates the flow of the connection process when the portable information terminal 100 is arranged on the touch panel type display screen 202 (see FIG. 2A), but a similar process is performed when it is detected that the portable information terminal 100 is arranged at a predetermined position in proximity to the display screen 2002 (see FIG. 2B).

Hereinafter, the flow of the connection process between the portable information terminal 100 and the display device 200 will be described with reference to FIG. 6.

Start of the process in the portable information terminal 100 becomes possible (step S101) and the portable information terminal 100 is arranged on the display screen 202 (step S102).

Next, in the display device 200, the terminal detection unit 212 detects that the portable information terminal 100 is arranged on the display screen 202 (step S103), and the display processing unit 213 displays a circular window 203 indicating that the portable information terminal 100 is detected in an area of the display screen 202 according to the position of the portable information terminal 100 (step S104).

As illustrated in FIG. 2B, in a case that it is detected that the portable information terminal 100 is arranged at a predetermined position A in proximity to the display screen 202, the above-mentioned step S102 becomes an operation in which the portable information terminal 100 is arranged at the predetermined position A of the display device 200A. In the same case, the process of the above-mentioned step S103 becomes a process in which the terminal detection unit 212 detects that the portable information terminal 100 is arranged at the predetermined position A of the display device 200A. Also in the same case, the process of the above-mentioned step S104 becomes a process of displaying the circular window 203 indicating that the portable information terminal 100 is detected in a preset predetermined area on the display screen 202.

Next, the data input/output processing unit 216 transmits "data area generation instruction information" for issuing an instruction for securing the data area 322 in the storage unit 321 to the cloud server 300 (step S105). This data area 322 is used when the transmission/reception of data is performed between the portable information terminal 100 and the display device 200.

Next, when the cloud server 300 receives the "data area generation instruction information" from the display device 200, the data input/output processing unit 312 generates the data area 322 in the storage unit 321 (step S106). Next, the data input/output processing unit 312 transmits "data area generation completion information" indicating that the data area 322 is generated in the storage unit 321 to the display device 200 (step S107). This "data area generation completion information" includes "URL information about the data area" indicating a location of the data area 322.

Next, when the display device 200 receives the "data area generation completion information" indicating that the data area 322 is generated from the cloud server 300, the instruction information generation unit 214 generates "storage instruction information" including the "URL information about the data area." Next, the display processing unit 213 transmits the "storage instruction information" to the portable information terminal 100 by causing blinking display of the window 203 to be performed (step S108).

Next, the portable information terminal 100 reads the blinking display of the window 203, that is, a temporal change of a luminance value, with the CCD camera of the imaging unit 116 and receives the "storage instruction information" transmitted from the display device 200 (step S109).

By executing the process of step S109, the connection process between the portable information terminal 100 and the display device 200 is completed (step S110).

Thus, when it is detected that the portable information terminal 100 has been arranged on the display screen 202 or it is detected that the portable information terminal 100 has been arranged at a predetermined position in proximity to the display screen 202, the display device 200 can link the detection with a manipulation of starting a data transmission application. Thus, it is possible to simplify the manipulation of starting the data transmission application.

Figure 7:
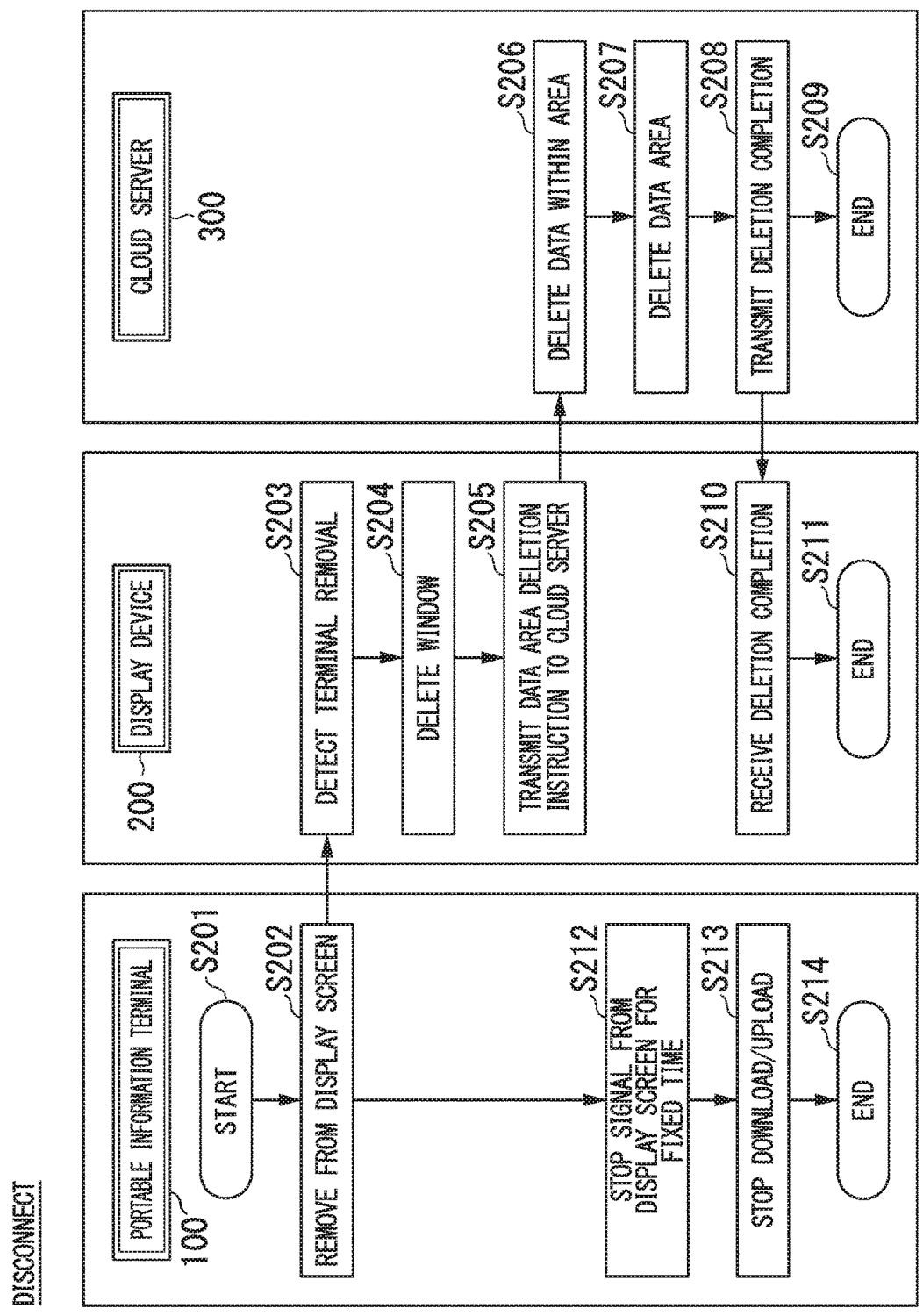
FIG. 7 is a sequence diagram illustrating a flow of a disconnection process between the portable information terminal 100 and the display device 200.

FIG. 7 is a sequence diagram illustrating a flow of a disconnection process between the portable information terminal 100 and the display device 200. The flowchart illustrated in FIG. 7 illustrates a detailed flow of the disconnection process of step S40 of the flowchart illustrated in FIG. 5.

Also, the disconnection process illustrated in FIG. 7 shows a flow of the disconnection process when the portable information terminal 100 (see FIG. 2A) arranged on the display screen 202 is removed, but a similar process is performed when the portable information terminal 100 (see FIG. 2B) arranged at a predetermined position in proximity to the display screen 202 is removed.

Hereinafter, the flow of the disconnection process between the portable information terminal 100 and the display device 200 will be described with reference to FIG. 7.

Start of the disconnection process becomes possible (step S201) and the portable information terminal 100 is removed from the display screen 202 (step S202).

Next, in the display device 200, the terminal detection unit 212 detects that the portable information terminal 100 is removed from the display screen 202 (step S203) and the display processing unit 213 deletes the display of the window 203 on the display screen 202 (step S204).

Also, as illustrated in FIG. 2B, in a case that it is detected that the portable information terminal 100 is arranged at the predetermined position A in proximity to the display screen 202, the above-mentioned step S202 becomes an operation in which the portable information terminal 100 is removed from the predetermined position A of the display device 200A. In the same case, the process of the above-mentioned step S203 is a process in which the terminal detection unit 212 detects that the portable information terminal 100 is removed from the predetermined position A of the display device 200A. Also in the same case, the process of the above-mentioned step S204 becomes a process of deleting the window 203 displayed in the predetermined area on the display screen 202.

Next, the data input/output processing unit 216 transmits "data area deletion instruction information" for issuing an instruction for deleting the data area 322 used when the transmission/reception of data is performed by the portable information terminal 100 and the display device 200 from the storage unit 321 to the cloud server 300 (step S205).

Next, when the cloud server 300 receives the "data area deletion instruction information" from the display device 200, the data input/output processing unit 312 deletes the data of the data area 322 in the storage unit 321 (step S206) and also deletes the data area 322 (step S207).

Next, the data input/output processing unit 312 of the cloud server 300 transmits the "data area deletion completion information" indicating that the deletion of the data area 322 is completed to the display device 200 (step S208). After the transmission process of the "data area deletion completion information" of step S208 is executed, the cloud server 300 ends the disconnection process (step S209).

Next, when the display device 200 receives "deletion completion information" indicating that the data area 322 is deleted from the cloud server 300 (step S210), the display device 200 ends the disconnection process (step S211).

On the other hand, when the display of the window 203 is deleted in the display device 200, the image information acquisition unit 115 detects that a luminance change of the window 203 read by the imaging unit 116 stops for a fixed time in the portable information terminal 100 (step S212) and upload and download of data to and from the cloud server 300 stop (step S213). After the process of step S213 is executed, the portable information terminal 100 ends the disconnection process (step S214).

Thus, when it is detected that the portable information terminal 100 has been removed from the touch panel type display screen 202 or it is detected that the portable information terminal 100 has been removed from a predetermined position in proximity to the display screen 202, the display device 200 can link the detection with a manipulation of stopping a data transmission application. Thus, it is possible to simplify the operation of stopping the data transmission application.

Further, every time the portable information terminal 100 is arranged on or near the display screen, the data area 322 for storing data to be moved between the display device 200 and the portable information terminal 100 is generated on the cloud server 300. Simultaneously, every time the portable information terminal 100 is removed, the data area 322 and the data stored therein are deleted each time. Therefore, it is possible to avoid the leakage of information from the cloud server 300.

Figure 8:
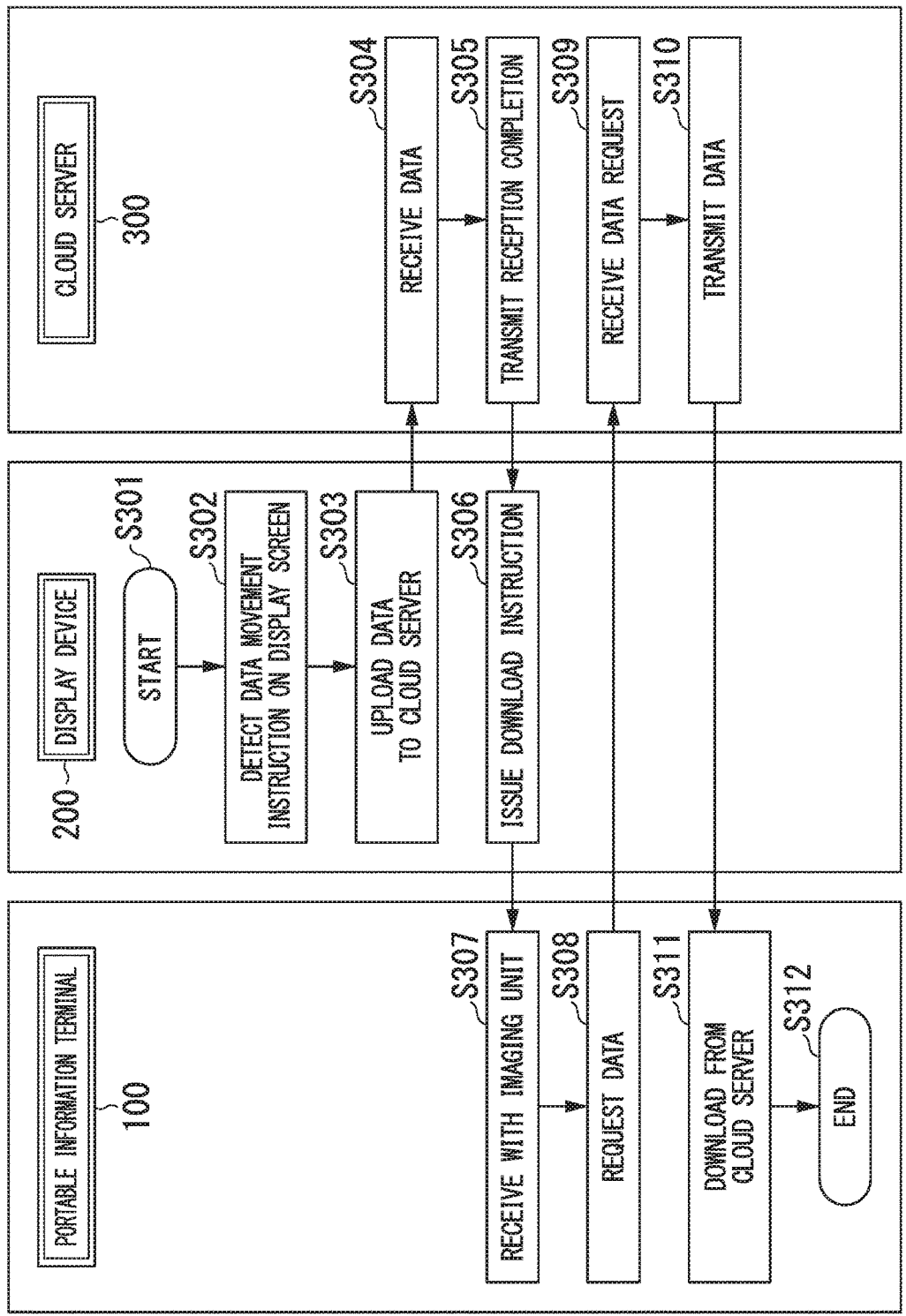
FIG. 8 is a sequence diagram illustrating a flow of a process of transmitting data of the display device 200 to the portable information terminal 100.

FIG. 8 is a sequence diagram illustrating a flow of a process of transmitting data of the display device 200 to the portable information terminal 100. The sequence diagram illustrated in FIG. 8 illustrates a detailed flow of the process of case 1, that is, a process of transmitting data stored in the display device 200 to the portable information terminal 100 via the cloud server 300, in the process of step S30 of the flowchart illustrated in FIG. 5. Hereinafter, the flow of the process will be described with reference to FIG. 8.

First, start of a process of transmitting data in the display device 200 becomes possible (step S301), the user performs the drag-and-drop manipulation of the image 205 (see FIG. 3A) indicating data to be moved on the display screen 202, and the manipulation detection unit 215 detects that a data movement instruction is issued (step S302). The data movement instruction on the display screen 202 is issued by the drag-and-drop manipulation using the mouse or the like or the drag-and-drop manipulation based on the touch manipulation on the touch panel of the display screen 202.

Next, the data input/output processing unit 216 of the display device 200 uploads the data to be moved to the cloud server 300 (step S303).

Next, the data input/output processing unit 312 of the cloud server 300 receives data uploaded from the display device 200 (step S304) and stores the received data in the data area 322.

Next, the data input/output processing unit 312 of the cloud server 300 transmits "reception completion information" including information indicating that data uploaded from the display device 200 is stored in the data area 322 and URL information indicating a storage location of data to the display device 200 (step S305).

Next, when the display device 200 receives the "reception completion information" from the cloud server 300, the display processing unit 213 causes blinking display of the window 203 on the display screen 202 to be performed and transmits "download instruction information" indicating a download instruction including the URL information indicating the storage location of the data to the portable information terminal 100 (step S306).

Next, the portable information terminal 100 reads the blinking display of the window 203 on the display screen 202 of the display device 200, that is, a temporal change of a luminance value of the window 203, with the imaging unit 116, and the image information acquisition unit 115 receives the "download instruction information" (step S307).

Next, the data input/output processing unit 112 of the portable information terminal 100 is linked to the cloud server 300 on the basis of URL information and transmits "data request information" for requesting the transmission of data stored in the data area 322 to the cloud server 300 (step S308).

Next, when the cloud server 300 receives the "data request information" from the portable information terminal 100 (step S309), the data input/output processing unit 312 transmits the data stored in the data area 322 of the storage unit 321 to the portable information terminal 100 (step S310).

Next, the portable information terminal 100 downloads data to be transmitted from the cloud server 300 with the data input/output processing unit 112 and stores the downloaded data in the storage unit 121 (step S311). After the process of step S312 is executed, the portable information terminal 100 ends the transmission/reception process of data between the portable information terminal 100 and the display device 200 (step S312).

Through the procedure of the above-mentioned processes, the display device 200 can store its own stored data in the portable information terminal 100 via the cloud server 300 by a simple method using the drag-and-drop manipulation.

Figure 9:
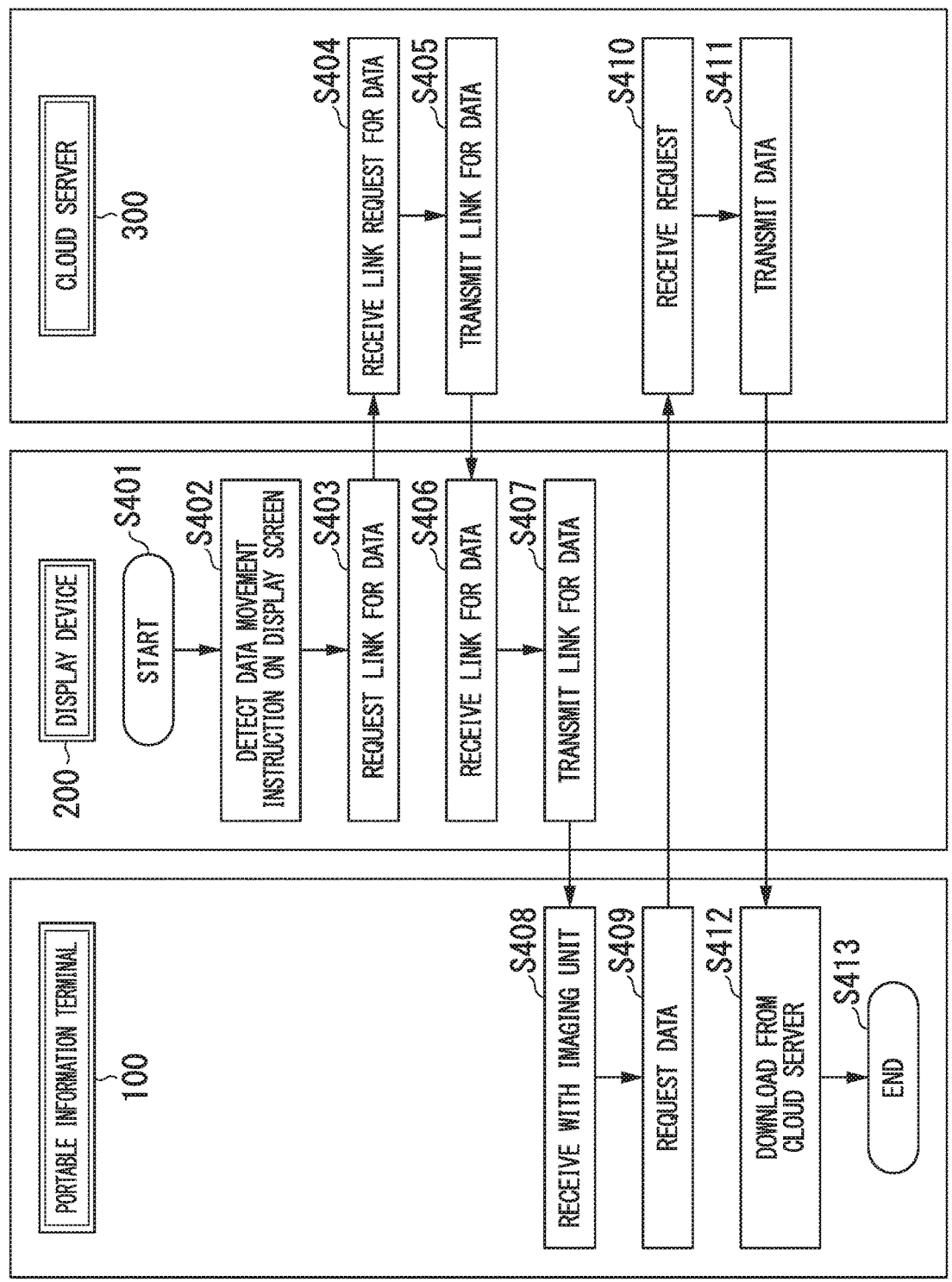
FIG. 9 is a sequence diagram illustrating a flow of a process of transmitting data of the cloud server 300 to the portable information terminal 100.

FIG. 9 is a sequence diagram illustrating a flow of a process of transmitting data of the cloud server 300 to the portable information terminal 100. The sequence diagram illustrated in FIG. 9 illustrates a detailed flow of the process of case 2, that is, a process of transmitting data stored in the cloud server 300 to the portable information terminal 100, in the process of step S30 of the flowchart illustrated in FIG. 5. Hereinafter, the flow of the process will be described with reference to FIG. 9.

First, when start of a process of transmitting data in the display device 200 becomes possible (step S401), the user performs the drag-and-drop manipulation of the image 205 (see FIG. 3A) indicating data to be moved on the display screen 202, and the manipulation detection unit 215 detects that a data movement instruction is issued (step S402). The data movement instruction on the display screen 202 is issued by the drag-and-drop manipulation using the mouse or the like or the drag-and-drop manipulation by the touch manipulation on the touch panel of the display screen 202.

Next, the data input/output processing unit 216 of the display device 200 transmits "link request information" indicating a link request for data to be moved to the cloud server 300 (step S403).

Next, when the data input/output processing unit 312 of the cloud server 300 receives the "link request information" from the display device 200 (step S404), "link information" indicating permission of a link for the data and URL information about a link destination is transmitted to the display device 200 (step S405).

Next, when the display device 200 receives the "link information" from the cloud server 300 (step S406), the data input/output processing unit 216 transmits the "link information" received from the cloud server 300 to the portable information terminal 100 (step S407). The transmission of the "link information" is performed by the display processing unit 213 causing blinking display of the window 203 on the display screen 202 to be performed.

Next, the portable information terminal 100 reads the blinking display of the window 203 on the display screen 202 of the display device 200, that is, a temporal change of a luminance value of the window 203, with the imaging unit 116, and the image information acquisition unit 115 receives the "link information" from the display device 200 (step S408).

Next, the data input/output processing unit 112 of the portable information terminal 100 transmits "data request information" for requesting the cloud server 300 to transmit data to be moved to the cloud server 300 on the basis of the "link information" received from the display device 200 (step S409).

Next, when the cloud server 300 receives the "data request information" from the portable information terminal 100 (step S410), the data input/output processing unit 312 extracts requested data from the storage unit 321 and transmits the extracted data to the portable information terminal 100 (step S411).

Next, the portable information terminal 100 downloads data transmitted from the cloud server 300 with the data input/output processing unit 112 and stores the downloaded data in the storage unit 121 (step S412). After the process of step S412 is executed, a process of transmitting and receiving data between the cloud server 300 and the portable information terminal 100 ends (step S413).

Through the procedure of the above-mentioned processes, the display device 200 can cause the portable information terminal 100 to store the data stored in the cloud server 300 by a simple method using the drag-and-drop manipulation.

Figure 10:
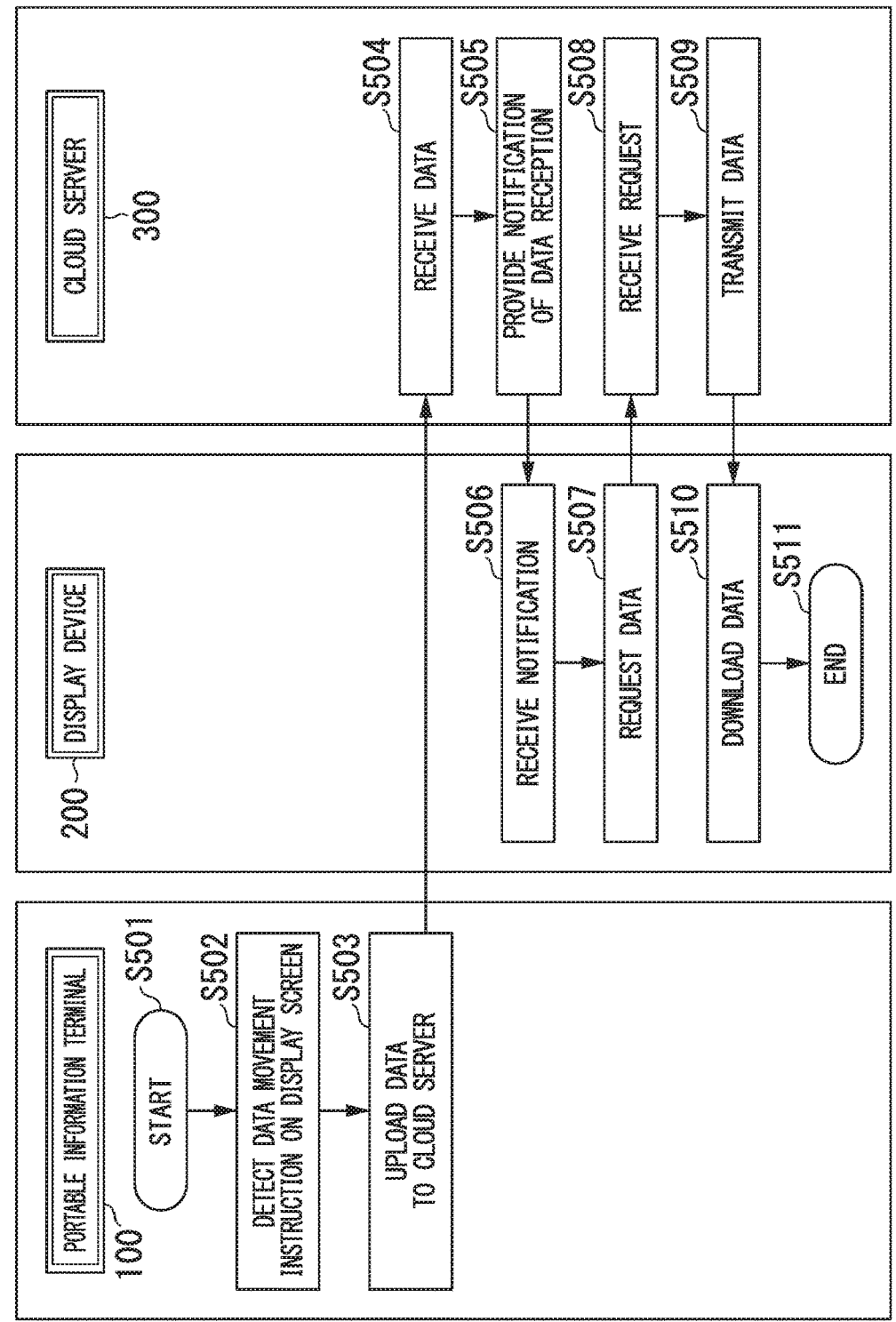
FIG. 10 is a sequence diagram illustrating a flow of a process of transmitting data of the portable information terminal 100 to the display device 200.

FIG. 10 is a sequence diagram illustrating a flow of a process of transmitting data of the portable information terminal 100 to the display device 200. The sequence diagram illustrated in FIG. 10 illustrates a detailed flow of the process of case 3, that is, a process of transmitting data stored in the portable information terminal 100 to the display device 200, in the process of step S30 of the flowchart illustrated in FIG. 5. Hereinafter, the flow of the process will be described with reference to FIG. 10.

First, when a process of transmitting data in the portable information terminal 100 is started (step S501), the user performs the drag-and-drop manipulation of the image 103 (see FIG. 3B) indicating data to be moved on the display screen 102, and the manipulation detection unit 114 detects that a data movement instruction is issued (step S502). The data movement instruction on the display screen is issued, for example, by the drag-and-drop manipulation based on the touch manipulation on the touch panel of the display screen 102.

Next, the data input/output processing unit 112 of the portable information terminal 100 uploads data to be moved to the cloud server 300 (step S503).

Next, the data input/output processing unit 312 of the cloud server 300 receives the data uploaded from the portable information terminal 100 (step S504) and stores the received data in the data area 322.

Next, the data input/output processing unit 312 of the cloud server 300 notifies the display device 200 of "data reception information" indicating that the data uploaded from the portable information terminal 100 is received and stored in the data area 322 (step S505).

Next, when the display device 200 receives the "data reception information" from the cloud server 300 (step S506), the data input/output processing unit 216 transmits "data request information" for requesting the transmission of data to the cloud server 300 (step S507).

Next, when the cloud server 300 receives the "data request information" from the display device 200 (step S508), the data input/output processing unit 312 transmits data stored in the data area 322 of the storage unit 321 to the display device 200 (step S509).

Next, the display device 200 downloads data transmitted from the cloud server 300 with the data input/output processing unit 216 and stores the downloaded data in the storage unit 221 (step S510). After the process of step S510 is executed, a process of transmitting and receiving data between the portable information terminal 100 and the display device 200 ends (step S511).

Through the procedure of the above-mentioned processes, the display device 200 can be caused to store the data stored in the portable information terminal 100 by a simple method using the drag-and-drop manipulation.

The embodiment of the present invention has been described above, but processing units constituting the portable information terminal 100, the display device 200, the display device 200A, and the cloud server 300 mentioned above may be implemented by dedicated hardware or functions of the processing units may be implemented by recording a program for implementing the functions on a computer-readable recording medium and causing the computer system to read and execute the program recorded on the recording medium.

That is, the portable information terminal 100, the display device 200, the display device 200A, and the cloud server 300 internally include a computer system. A process related to a series of the above-mentioned processes is stored in a computer-readable recording medium in the form of program and the above-mentioned processes are performed by the computer reading and executing the program. Here, the computer-readable recording medium is referred to as a magnetic disk, a magneto-optical disc, a compact disc read-only memory (CD-ROM), a digital versatile disc-read only memory (DVD-ROM), a semiconductor memory, or the like. Also, the computer program may be distributed to the computer by a communication line and the computer receiving the distributed computer program may execute the program. Also, the "computer system" mentioned here is assumed to include an operating system (OS) and hardware such as peripheral devices.

Also, here, correspondence relationships between the present invention and the above-mentioned embodiments will be additionally described.

That is, the portable information terminal in the present invention corresponds to the portable information terminal 100, the display device in the present invention corresponds to one or both of the display device 200 and the display device 200A (see FIG. 2B), and the display device 200 and the display device 200A are collectively referred to as the display device 200. Also, the first display panel in the present invention corresponds to the first display panel 201 of the display device 200 and the second display panel in the present invention corresponds to the second display panel 101 of the portable information terminal 100.

Also, the first display processing unit in the present invention corresponds to the display processing unit 213 of the display device 200 and the second display processing unit in the present invention corresponds to the display processing unit 113 of the portable information terminal 100. Also, the first input/output processing unit in the present invention corresponds to the data input/output processing unit 216 of the display device 200 and the second input/output processing unit in the present invention corresponds to the data input/output processing unit 112 of the portable information terminal 100. Also, the first manipulation detection unit in the present invention corresponds to the manipulation detection unit 215 of the display device 200 and the second manipulation detection unit in the present invention corresponds to the manipulation detection unit 114 of the portable information terminal 100. Also, the imaging unit in the present invention corresponds to the imaging unit 116 of the portable information terminal 100 and the information acquisition unit in the present invention corresponds to the image information acquisition unit 115 of the portable information terminal 100.

(1) In the above-mentioned embodiment, the data transfer system 1 includes the display device 200 and the portable information terminal 100. The display device 200 in the data transfer system 1 includes: the first display panel 201 having the display screen 202 (the first display screen) for displaying an image; the terminal detection unit 212 configured to detect that the portable information terminal 100 has approached the display screen 202 (the first display screen); and the display processing unit (the first display processing unit) 213 configured to cause the window 203 (the storage location image) which is an image indicating information about a storage location of data in the cloud server 300 (another device) to be displayed on the display screen 202 (the first display screen) when the approach of the portable information terminal 100 is detected by the terminal detection unit 212.

In the data transfer system 1 with such a configuration, when it is detected that the portable information terminal 100 has approached the display screen 202 (the first display screen), the display device 200 displays the window 203 (the storage location image) indicating information about the data storage location in the cloud server 300 (the other device) on the display screen 202.

Thus, in the data transfer system 1, the display device 200 can detect the approach of the portable information terminal 100 and display information about the data storage location in the other device on the display screen 202 (the first display screen) in an image according to the detection. The information about the data storage location is displayed as the window 203 (the storage location image) in the display screen 202.

Thereby, the data transfer system 1 can transfer data via another device between the portable information terminal 100 and the display device 200 without a cable connection, a wireless pairing manipulation, or the like between the portable information terminal 100 and the display device 200 being performed. For example, the cloud server 300 may be applied to the other device.

(2) Also, in the above-mentioned embodiment, the portable information terminal 100 includes the imaging unit 116; and the image information acquisition unit (information acquisition unit) 115 configured to acquire the information about the cloud server 300 which is the storage location on the basis of the storage location image captured by the imaging unit 116.

According to the portable information terminal 100 with such a configuration, the image information acquisition unit (information acquisition unit) 115 acquires the information about the cloud server 300 which is the storage location on the basis of the storage location image captured by the imaging unit 116.

Thereby, the data transfer system 1 can transfer data via the cloud server 300 (the other device) between the portable information terminal 100 and the display device 200 without a cable connection, a wireless pairing manipulation, or the like between the portable information terminal 100 and the display device 200 being performed.

(3) Also, in the above-mentioned embodiment, the display device 200 further includes a data input/output processing unit 216 (the first input/output processing unit) configured to acquire data stored in the cloud server 300 which is the storage location or store data in the storage location, wherein the portable information terminal 100 includes the data input/output processing unit 112 (the second input/output processing unit) configured to acquire data stored in the storage location or store the data in the storage location.

According to the display device 200 with such a configuration, the data input/output processing unit 216 acquires data stored in the cloud server 300 which is the storage location or stores the data in the storage location. Also, according to the portable information terminal 100 with such a configuration, the data input/output processing unit 112 acquires the data stored in the storage location or stores the data in the storage location.

Thereby, the data transfer system 1 can transfer data via the cloud server 300 (the other device) between the portable information terminal 100 and the display device 200 without a cable connection, a wireless pairing manipulation, or the like between the portable information terminal 100 and the display device 200 being performed.

(4) Also, in the above-mentioned embodiment, the display processing unit 213 (the first display processing unit) causes a first data image which is an image indicating first data to be sent to the portable information terminal 100 to be displayed on the display screen 202 (the first display screen), and the display processing unit 213 (the first display processing unit) further includes: the manipulation detection unit 215 (the first manipulation detection unit) configured to detect a first manipulation of moving the first data image to a predetermined first area; and the instruction information generation unit 214 (the instruction image display unit) configured to cause an instruction image which is an image indicating information about an instruction for acquiring the first data to be displayed on the display screen 202 (the first display screen) when the first manipulation detection unit 215 detects the first manipulation. The image information acquisition unit 115 (the information acquisition unit) further acquires the instruction information on the basis of the instruction image captured by the imaging unit 116.

According to the display device 200 with such a configuration, the display processing unit 213 (the first display processing unit) causes the first data image which is the image indicating the first data to be sent to the portable information terminal 100 to be displayed on the display screen 202 (the first display screen). The manipulation detection unit 215 (the first manipulation detection unit) detects the first manipulation of moving the first data image to the predetermined first area. The instruction information generation unit 214 causes the instruction image which is the image indicating information about the instruction for acquiring the first data to be displayed on the display screen 202 (the first display screen) when the first manipulation detection unit 215 detects the first manipulation.

Thereby, the data transfer system 1 can transfer data via the cloud server 300 (the other device) between the portable information terminal 100 and the display device 200 without a cable connection, a wireless pairing manipulation, or the like between the portable information terminal 100 and the display device 200 being performed.

(5) Also, in the above-mentioned embodiment, the data input/output processing unit 216 (the first input/output processing unit) stores the first data in the storage location when the manipulation detection unit 215 (the first manipulation detection unit) detects the first manipulation, and the data input/output processing unit 112 (the second input/output processing unit) acquires the first data stored in the storage location when the image information acquisition unit 115 (the information acquisition unit) acquires the instruction information.

Thereby, the data transfer system 1 can transfer the above-mentioned first data via the cloud server 300 (the other device) between the portable information terminal 100 and the display device 200 without a cable connection, a wireless pairing manipulation, or the like between the portable information terminal 100 and the display device 200 being performed.

(6) Also, in the above-mentioned embodiment, the predetermined first area is an area of part of the display screen 202 (the first display screen) that the portable information terminal 100 has approached.

According to the display device 200 with such a configuration, the manipulation detection unit 215 (the first manipulation detection unit) detects the first manipulation of causing the first data image to be moved to the area of the part of the display screen 202 (the first display screen) which is the predetermined first area.

Thereby, the data transfer system 1 can transfer data via the cloud server 300 (the other device) between the portable information terminal 100 and the display device 200 by detecting the first manipulation of causing the image to be moved to the area of the part of the display screen 202 (the first display screen) without a cable connection, a wireless pairing manipulation, or the like between the portable information terminal 100 and the display device 200 being performed.

(7) Also, in the above-mentioned embodiment, the portable information terminal 100 further includes the second display panel 101 having a second display screen for displaying an image; the display processing unit 113 (the second display processing unit) configured to cause a second data image which is an image indicating second data to be sent to the display device 200 to be displayed on the second display screen; and the manipulation detection unit 114 (the second manipulation detection unit) configured to detect a second manipulation of moving the second data image to a predetermined second area. The data input/output processing unit 112 (the second input/output processing unit) stores the second data in the storage location when the second manipulation detection unit 114 detects the second manipulation. The data input/output processing unit 216 (the first input/output processing unit) acquires the second data stored in the storage location.

According to the portable information terminal 100 with such a configuration, the second display panel 101 has the second display screen for displaying an image. The display processing unit 113 (the second display processing unit) causes the second data image which is the image indicating second data to be sent to the second display panel 101 and the display device 200 to be displayed on the second display screen. The manipulation detection unit 114 (the second manipulation detection unit) detects the second manipulation of moving the second data image to the predetermined second area. The data input/output processing unit 112 (the second input/output processing unit) stores the second data in the storage location when the second manipulation detection unit 114 detects the second manipulation. The data input/output processing unit 216 (the first input/output processing unit) acquires the second data stored in the storage location.

Thereby, the data transfer system 1 can transfer data via the cloud server 300 (the other device) between the portable information terminal 100 and the display device 200 without a cable connection, a wireless pairing manipulation, or the like between the portable information terminal 100 and the display device 200 being performed.

(8) Also, in the above-mentioned embodiment, the display processing unit 113 (the second display processing unit) causes a display device image which is an image indicating the display device 200 to be displayed on the display screen 102 (the second display screen). The predetermined second area is an area of part of the second display screen in which the display device image is displayed.

According to the portable information terminal 100 with such a configuration, the display processing unit 113 (the second display processing unit) causes the display device image which is the image indicating the display device 200 to be displayed on the display screen 102 (the second display screen). The predetermined second area which is a destination to which the second data image is moved is an area of part of the display screen 102 (the second display screen) in which the display device image is displayed.

Thereby, the data transfer system 1 can transfer data via the cloud server 300 (the other device) between the portable information terminal 100 and the display device 200 on the basis of information displayed on the display screen 102 without a cable connection, a wireless pairing manipulation, or the like between the portable information terminal 100 and the display device 200 being performed.

(9) Also, in the above-mentioned embodiment, the storage location image is an image obtained by changing a luminance value according to the passage of time.

The display device 200 with such a configuration displays the storage location image with changing a luminance value of the storage location image according to the passage of time.

Thereby, the data transfer system 1 can transmit information to the portable information terminal 100 with changing the luminance value of the storage location image displayed on the display screen 202 and transfer data via the cloud server 300 (the other device) between the portable information terminal 100 and the display device 200 without a cable connection, a wireless pairing manipulation, or the like between the portable information terminal 100 and the display device 200 being performed.

Although embodiments of the present invention have been described above, the data transfer system of the present invention is not limited to the above-mentioned illustrated examples and, of course, various changes can be made without departing from the scope of the present invention.

For example, the present invention can also be preferably used in a projector.

Figure 11:
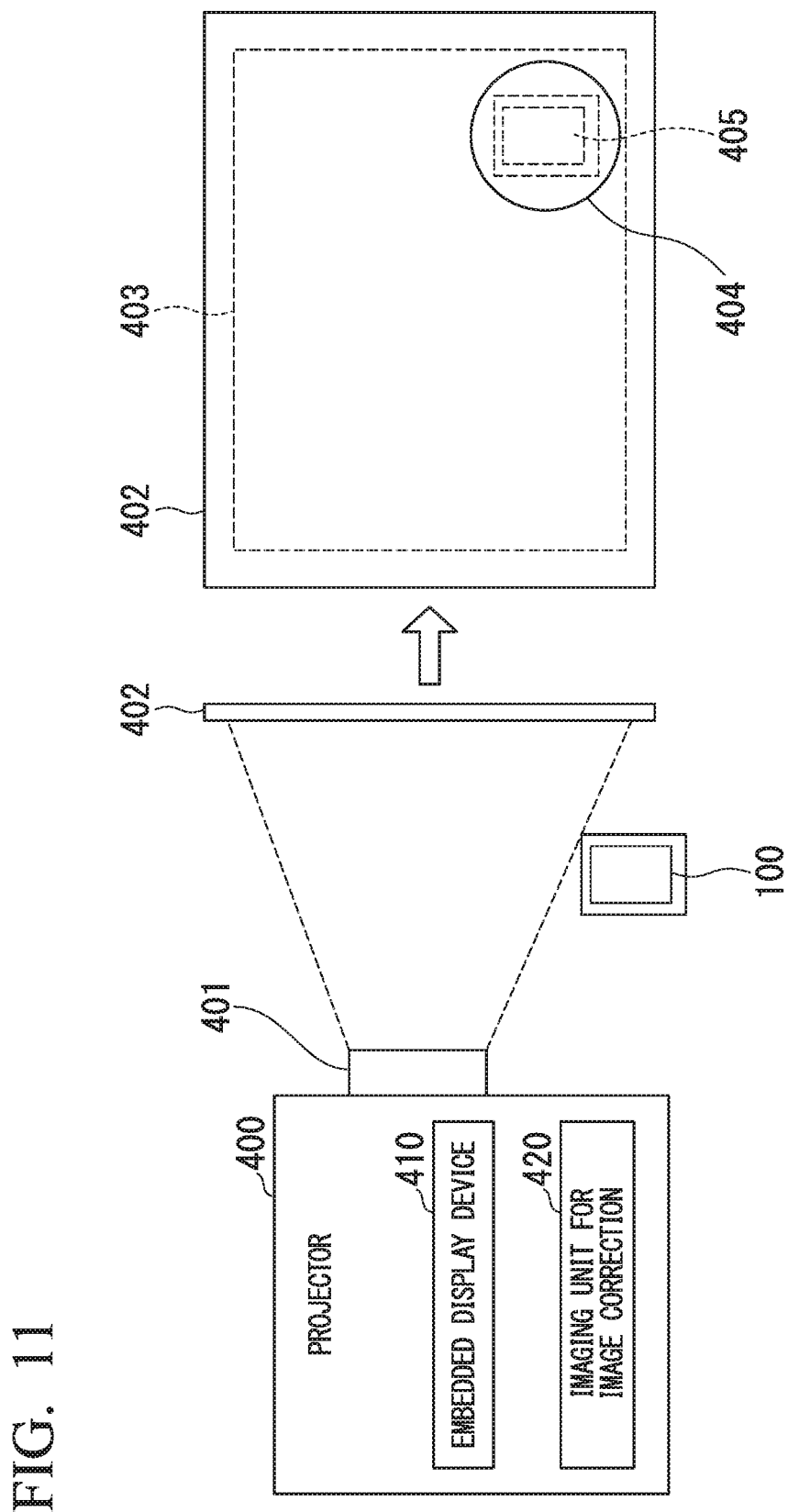
FIG. 11 is an explanatory diagram illustrating an example in which the data transfer system of the present invention is applied to a projector.

FIG. 11 is an explanatory diagram illustrating an example in which the data transfer system of the present invention is applied to the projector. The projector 400 illustrated in FIG. 11 causes light emitted from a light source lamp (not illustrated) to transmit through a liquid crystal panel (not illustrated) and projects a display image 403 on a screen 402 through a lens 401. Also, the projector 400 includes an embedded display device 410 and an imaging unit 420 for image correction.

This projector 400 detects the approach of the portable information terminal 100 with the imaging unit 420. When the approach of the portable information terminal 100 is detected, the projector 400 displays an image 405 indicating that the portable information terminal 100 is detected and a circular window 404 surrounding the image 405 in a predetermined area of the display image 403 by control of the embedded display device 410. Also, when it is detected by the imaging unit 420 that the portable information terminal 100 is removed, the projector 400 deletes the image 405 and the circular window 404 displayed in the display image 403.

For example, as in the case of the above-mentioned display device 200, the projector 400 generates "storage instruction information" including URL information about a storage location of data stored in the cloud server 300 and transmits the "storage instruction information" to the portable information terminal 100 by causing blinking display of the window 203 to be performed.

Thereby, the projector 400 and the portable information terminal 100 can transfer data via the cloud server 300 without a cable connection, a wireless pairing manipulation, or the like being performed.

INDUSTRIAL APPLICABILITY

The present invention can be applied to a data transfer system, an information processing device, a portable information terminal, a data transfer method, and a program because it is possible to transfer data between a portable information terminal and an information processing device without a cable connection, a wireless pairing manipulation, or the like being performed.

REFERENCE SYMBOLS

1 Data transfer system
10 Communication network
100 Portable information terminal 101 Second display panel
102 Display screen (second display screen)
111 Communication processing unit
112 Data input/output processing unit (second input/output processing unit)
113 Display processing unit (second display processing unit)
114 Manipulation detection unit (second manipulation detection unit)
115 Image information acquisition unit (information acquisition unit)
116 Imaging unit
121 Storage unit
200, 200A Display device
201 First display panel
202 Display screen (first display screen)
211 Communication processing unit
212 Terminal detection unit
213 Display processing unit (first display processing unit),
214 Instruction information generation unit
215 Manipulation detection unit (first manipulation detection unit)
216 Data input/output processing unit (first input/output processing unit)
221 Storage unit
300 Cloud server
311 Communication processing unit
312 Data input/output processing unit
321 Storage unit
322 Data area
400 Projector

The invention claimed is:

1. A portable information terminal, comprising:
an image capture device that captures a storage location image displayed on a display device to acquire information indicating a storage location in a server device;
a display panel including a display screen that displays a data image and a display device image indicating the display device; and
a manipulation detection sensor that detects, on the display screen, a manipulation of moving the data image toward the display device image,
wherein the portable information terminal stores data in the storage location when the manipulation detection sensor detects the manipulation,
wherein the image capture device captures an instruction image displayed on the display device to receive a download instruction to read data stored in the storage location in the server device, and
wherein the portable information terminal transmits a data request to the server device in response to the download instruction and receives the data that the server device transmits in response to the data request.

2. The portable information terminal according to claim 1, wherein the image capture device captures the storage location image displayed on the display device when the portable information terminal is arranged on the display device, and acquires the information indicating the storage location through the storage location image.

3. The portable information terminal according to claim 2, wherein the storage location image is deleted from the display device when the portable information terminal is removed from the display device.

4. The portable information terminal according to claim 1, wherein the display device acquires the data stored in the storage location in the server device.

5. The portable information terminal according to claim 1, wherein the image capture device captures the instruction image blinking, and
wherein a temporal change of the blinking indicates the download instruction.

6. The portable information terminal according to claim 1, wherein the download instruction includes a uniform resource locator (URL) used to locate data that is stored in the server device, and
wherein the portable information terminal transmits the data request based on the URL to the server device and receives the data that the server device transmits in response to the data request.

7. The portable information terminal according to claim 6, wherein the image capture device captures the instruction image blinking, and
wherein a temporal change of the blinking indicates the URL.

8. The portable information terminal according to claim 1, wherein the image capture device captures the storage location image displayed on the display device when the portable information terminal is arranged close to the display device, and acquires the information indicating the storage location through the storage location image.

9. A data transfer method performed by a portable information terminal, the data transfer method comprising:
capturing a storage location image displayed on a display device to acquire information indicating a storage location in a server device;
displaying a data image and a display device image on a display screen included in the portable information terminal, the display image indicating the display device;
detecting, on the display screen, a manipulation of moving the data image toward the display device image;
storing data in the storage location when the manipulation is detected;
capturing an instruction image displayed on the display device to receive a download instruction to read data stored in the storage location in the server device;
transmitting a data request to the server device in response to the download instruction; and
receiving the data that the server device transmits in response to the data request.

10. The data transfer method according to claim 9, wherein the capturing is performed when the portable information terminal is arranged on the display device, and
wherein the information indicating the storage location is acquired through the storage location image.

11. The data transfer method according to claim 10, wherein the storage location image is deleted from the display device when the portable information terminal is removed from the display device.

12. The data transfer method according to claim 9, wherein the data stored in the storage location is acquired by the display device.

13. The data transfer method according to claim 9, wherein the instruction image is blinking, and
wherein a temporal change of the blinking indicates the download instruction.

14. The data transfer method according to claim 9,
wherein the download instruction includes a uniform resource locator (URL) used to locate data that is stored in the server device, and
wherein the transmitting the data request is performed based on the URL.

15. The data transfer method according to claim 14, wherein the instruction image is blinking, and wherein a temporal change of the blinking indicates the URL.

16. The data transfer method according to claim 9, wherein the storage location image is displayed on the display device when the portable information terminal is arranged close to the display device, and wherein the information indicating the storage location is acquired through the storage location image.

17. A portable information terminal, comprising:

a processor; and memory coupled with the processor, the memory storing instructions, when executed by the processor, causing the portable information terminal to:

capture a storage location image displayed on a display device to acquire information indicating a storage location in a server device;

display a data image and a display device image on a display screen included in the portable information terminal, the display image indicating the display device;

detect, on the display screen, a manipulation of moving the data image toward the display device image;

store data in the storage location when the manipulation is detected;

capture an instruction image displayed on the display device to receive a download instruction to read data stored in the storage location in the server device;

transmit a data request to the server device in response to the download instruction; and receive the data that the server device transmits in response to the data request.

18. The portable information terminal according to claim 17, wherein the instruction image is blinking, and wherein a temporal change of the blinking indicates the download instruction.

* * * * *